July 15, 1952  J. W. BRYCE ET AL  2,603,151
RECORD CARD SENSING AND ANALYZING MEANS
Filed Nov. 3, 1947  10 Sheets-Sheet 3

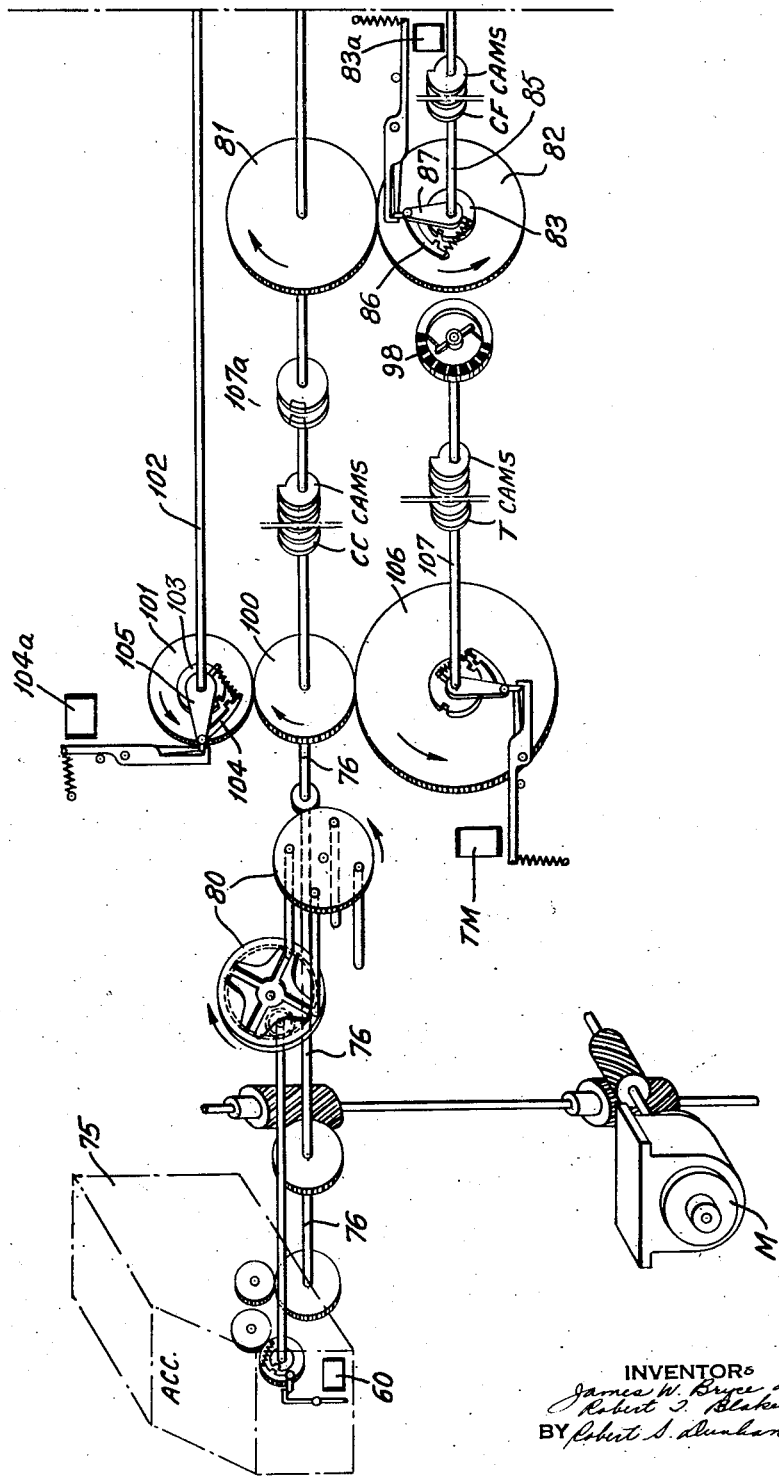

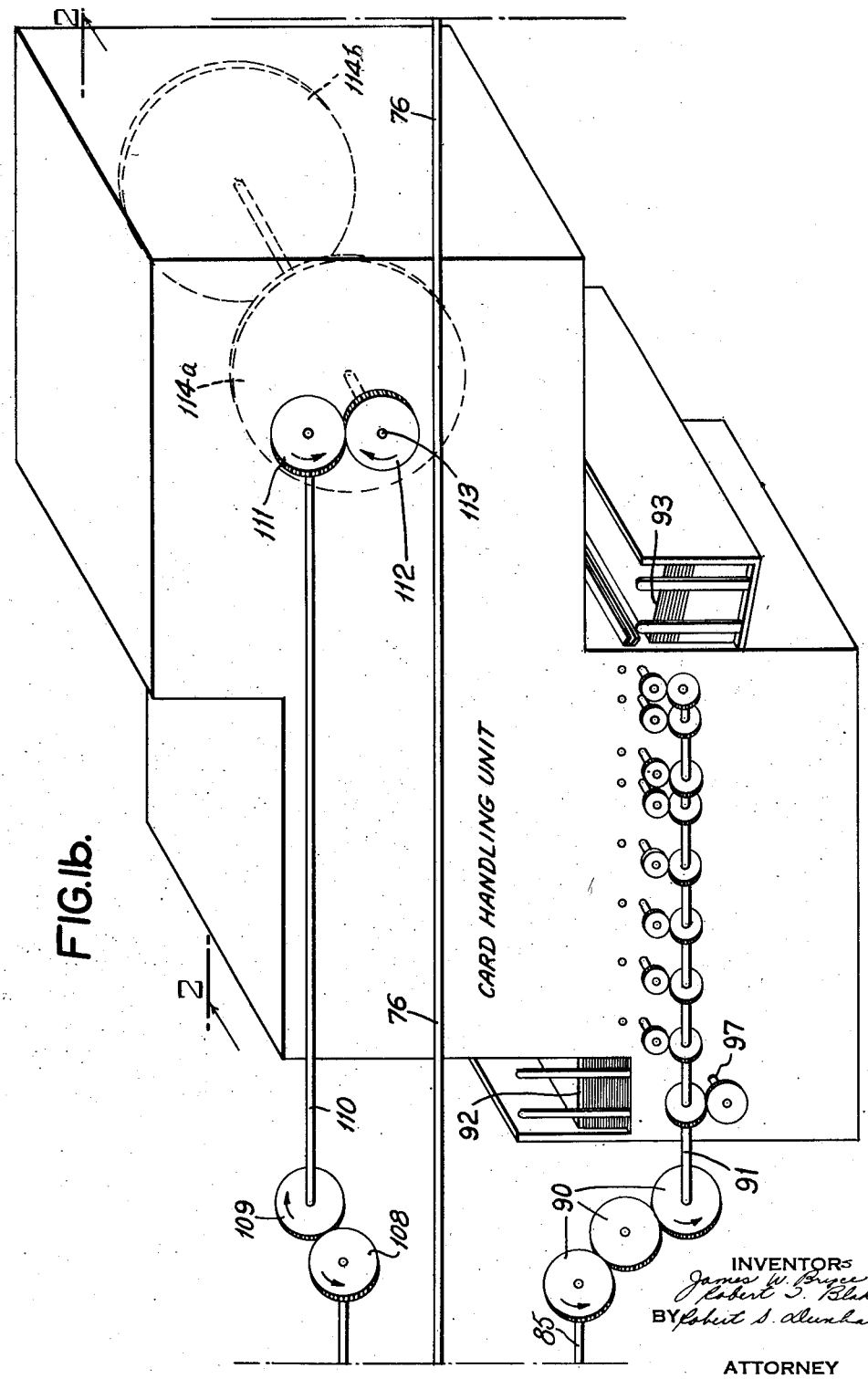

INVENTORS
James W. Bryce and
Robert S. Blakely
BY Robert S. Dunham
ATTORNEY

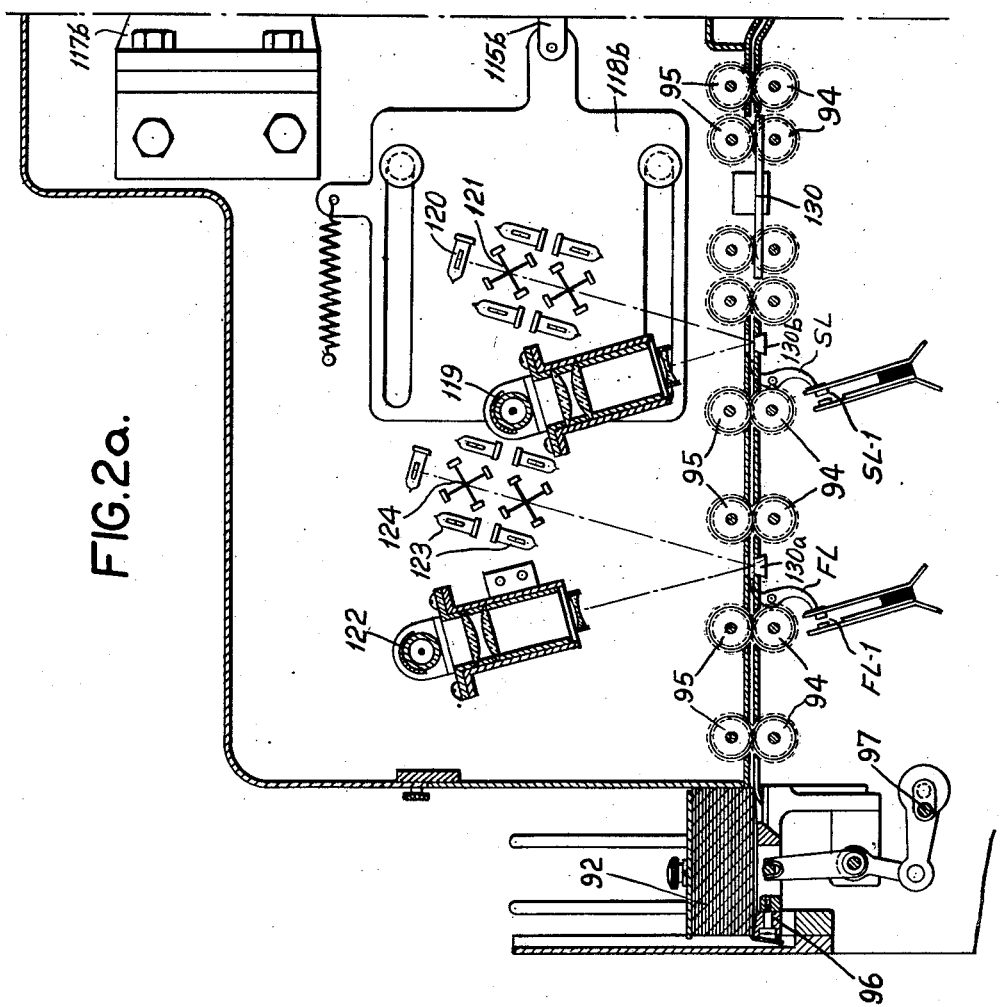

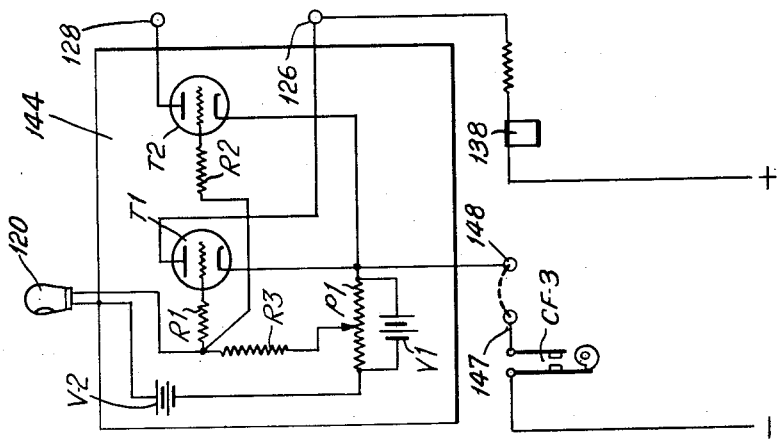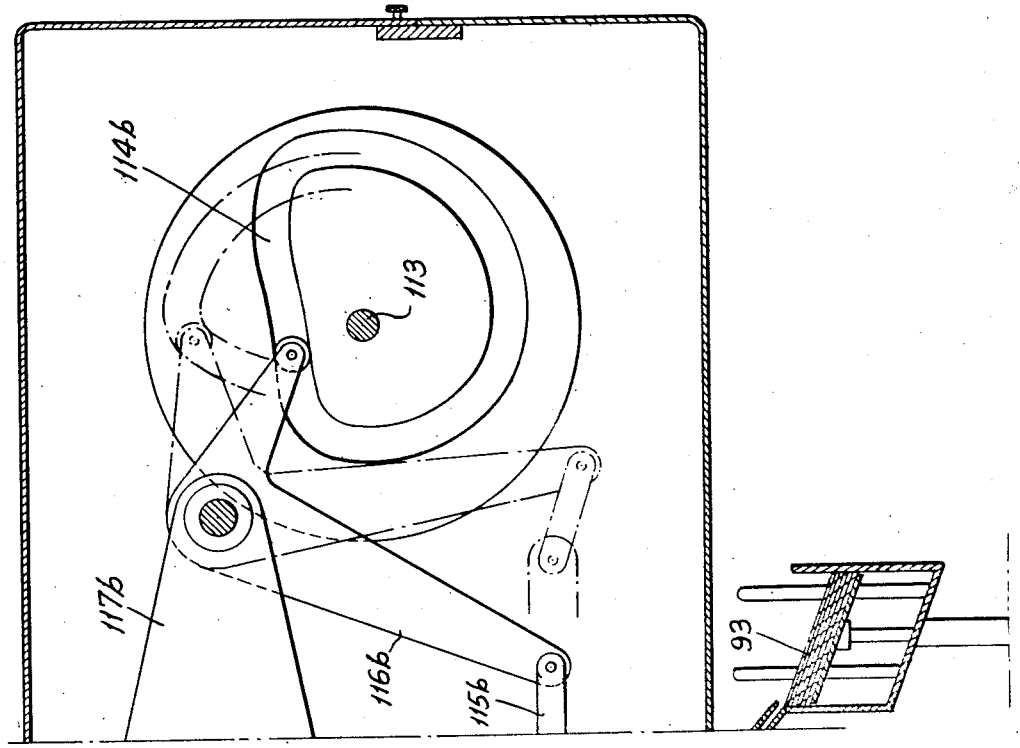

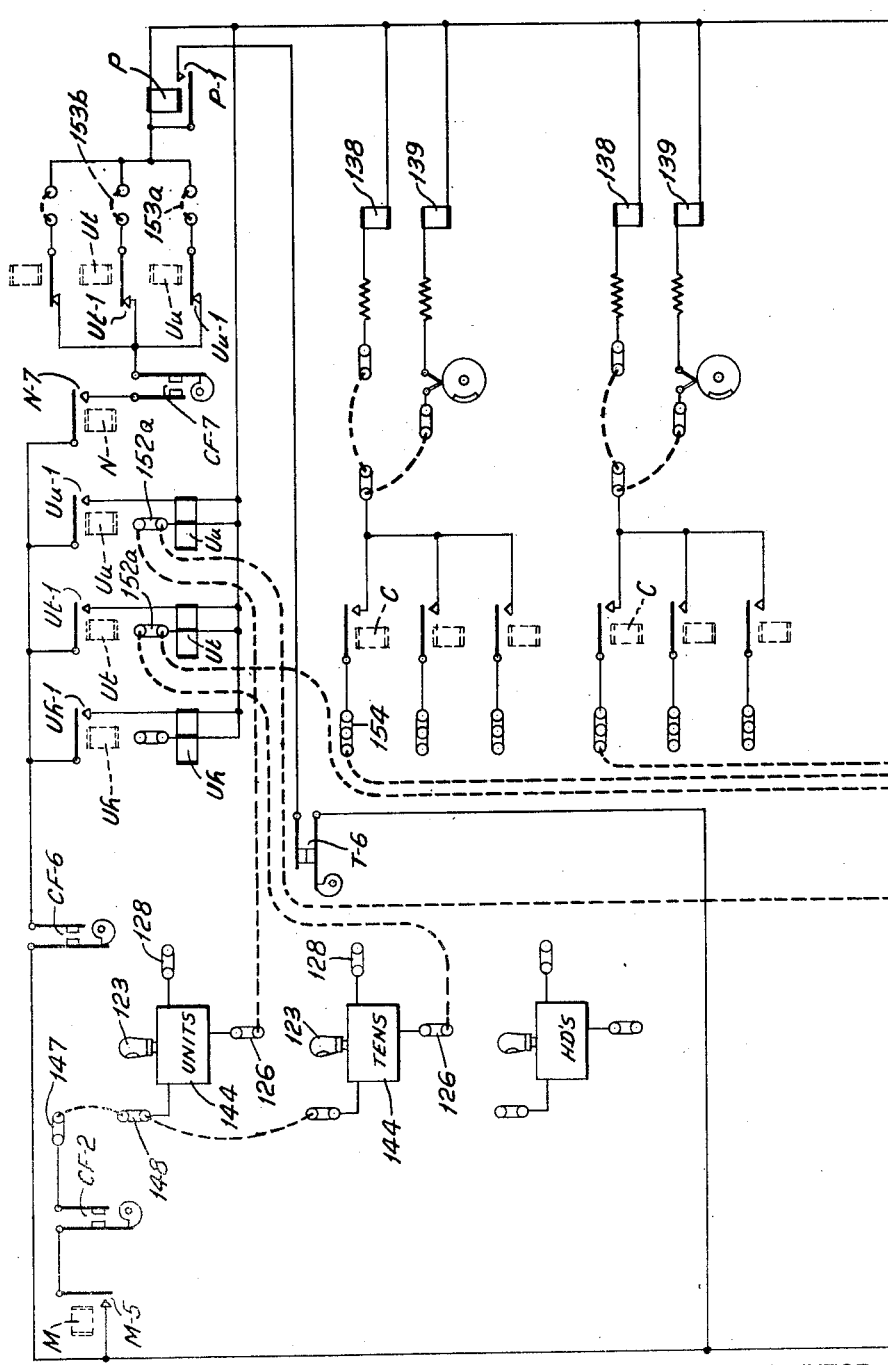

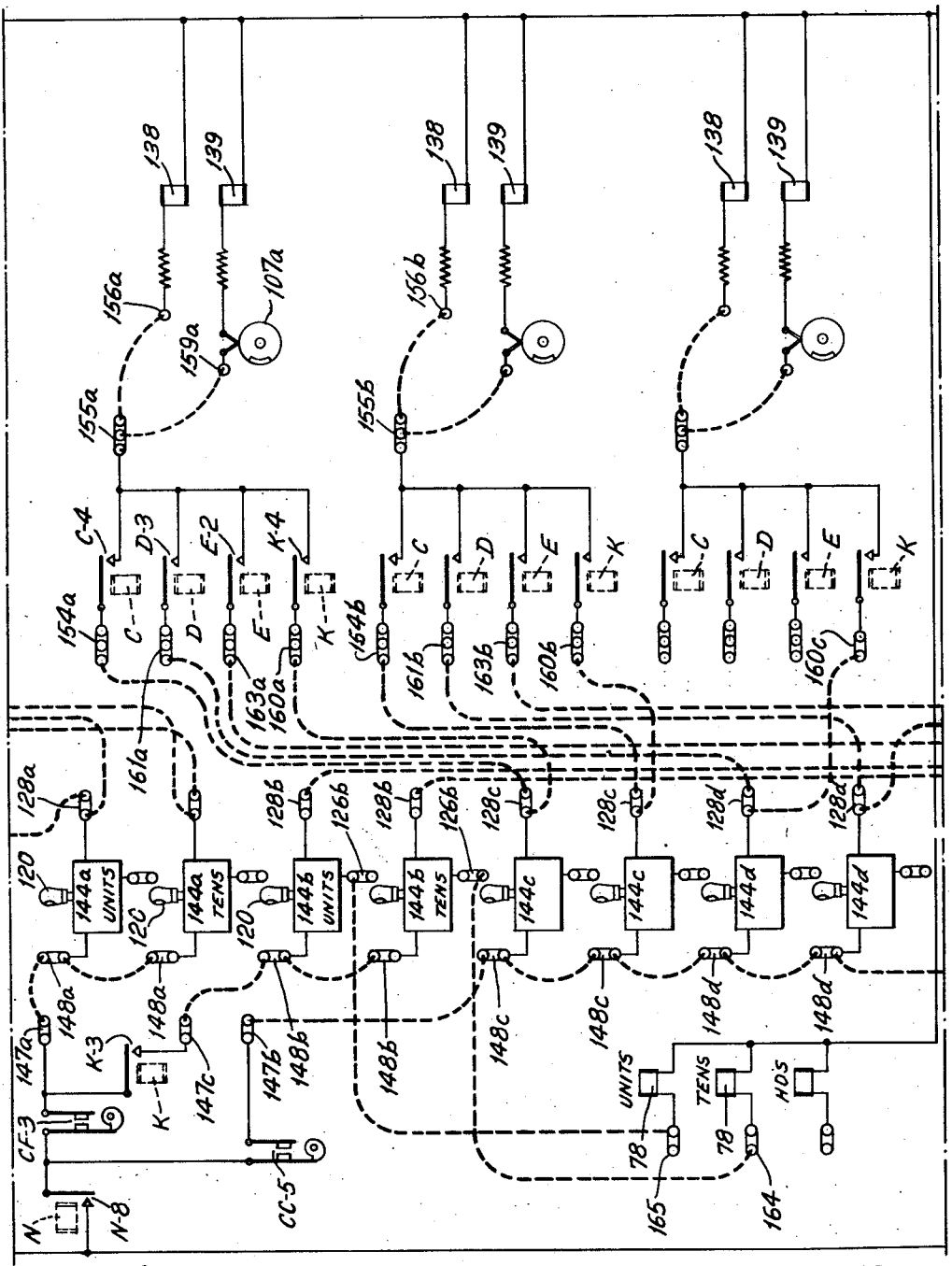

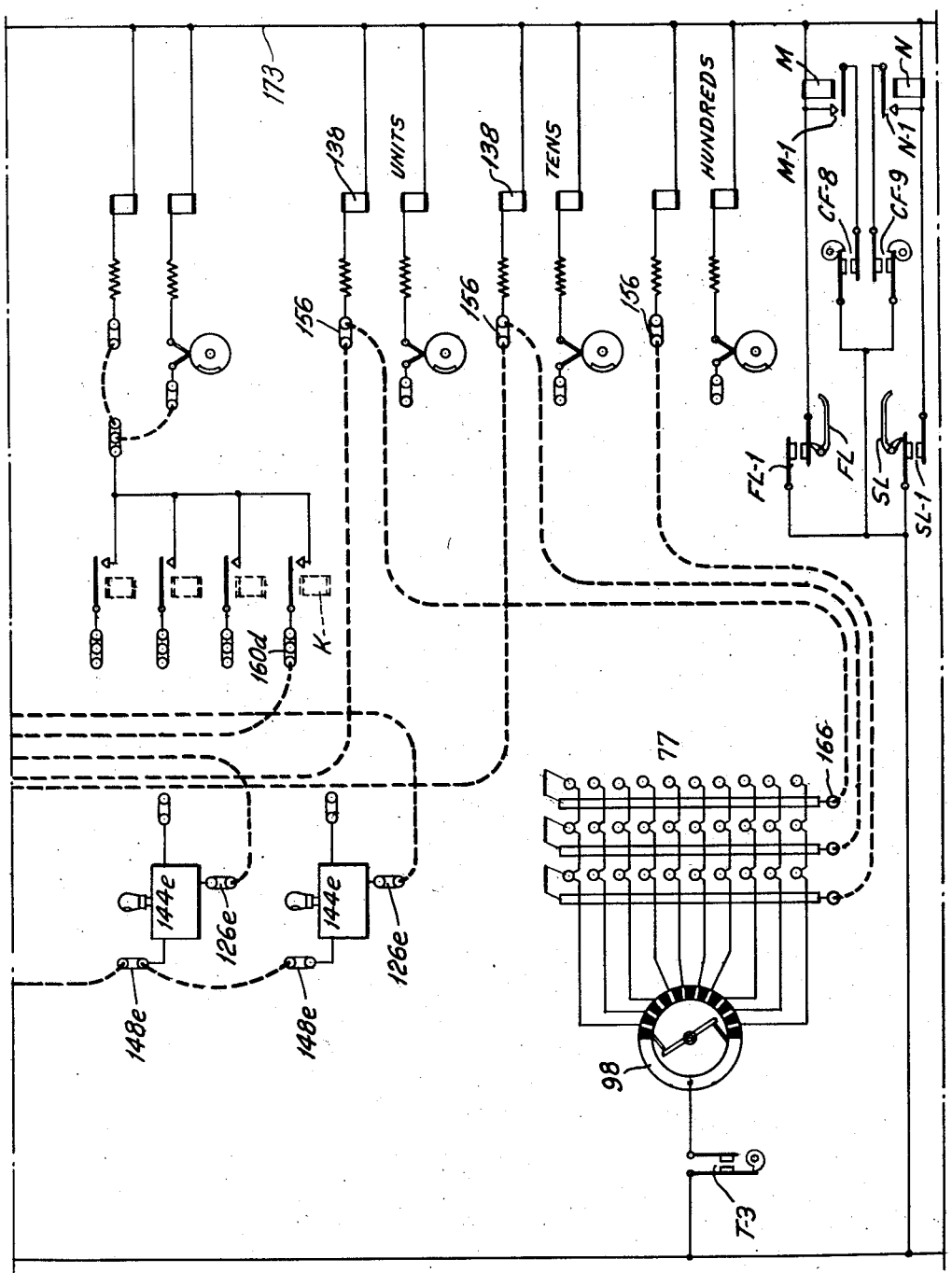

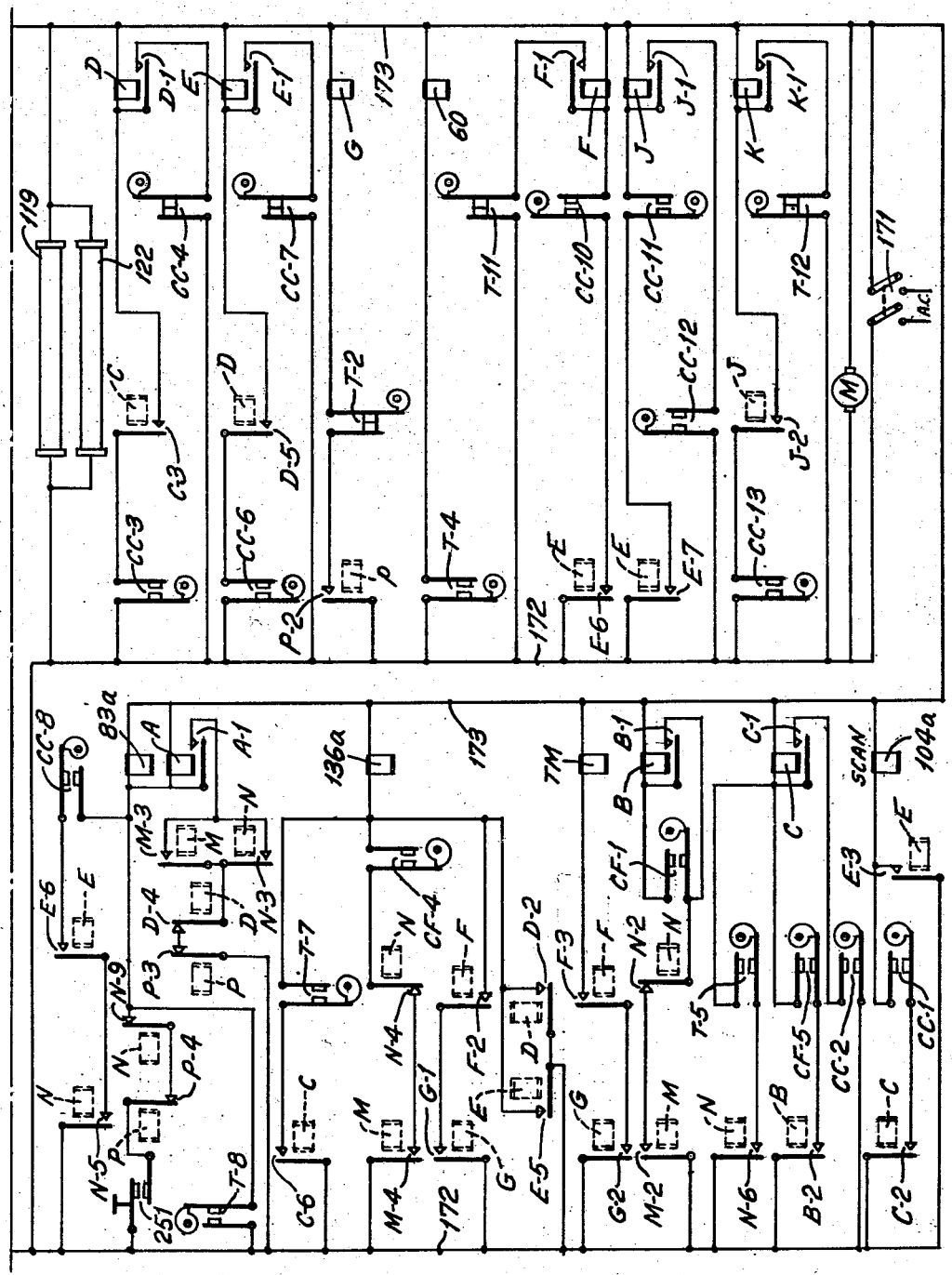

July 15, 1952      J. W. BRYCE ET AL      2,603,151
RECORD CARD SENSING AND ANALYZING MEANS
Filed Nov. 3, 1947      10 Sheets-Sheet 10
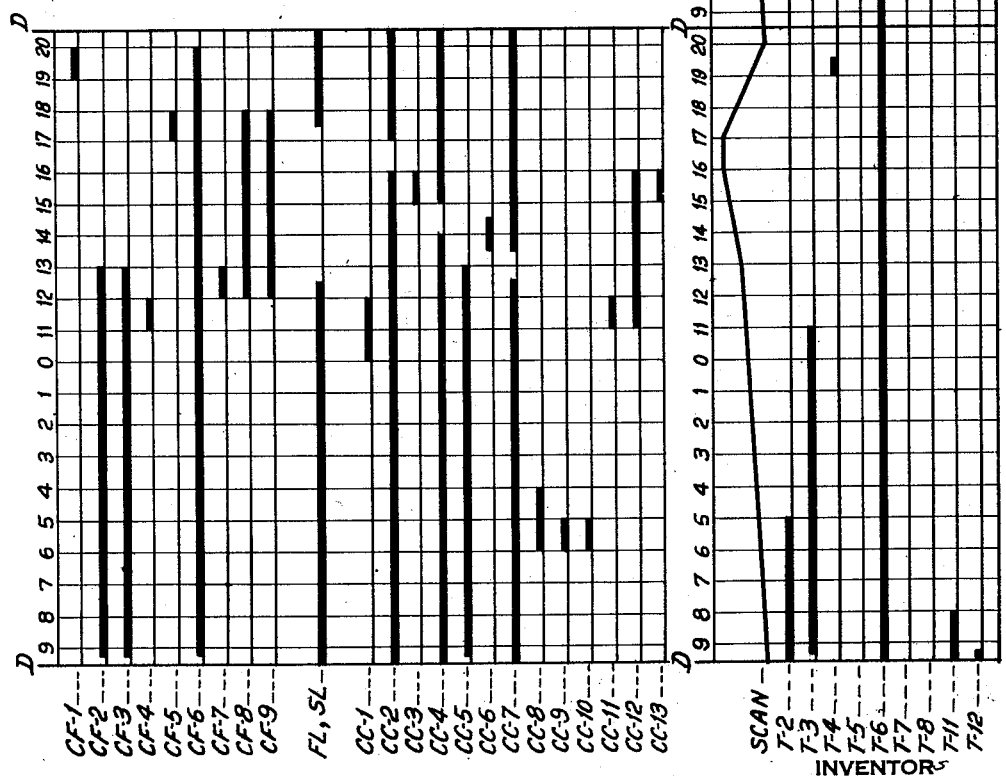

Patented July 15, 1952

2,603,151

UNITED STATES PATENT OFFICE 2,603,151

RECORD CARD SENSING AND ANALYZING MEANS

James W. Bryce, Glen Ridge, N. J., and Robert T. Blakely, Amityville, N. Y., assignors to International Business Machines Corporation, New York, N. Y., a corporation of New York Application November 3, 1947, Serial No. 783,782

11 Claims. (Cl. 101—93)

This invention relates to an improved alphabetical and record controlled printing tabulating machine. In this particular art the use of so-called alphabetical machines has become increasingly important. Such machines are now required to perform complete billing and accounting operations. One desired feature has been to provide a machine which will automatically handle a group of cards and prepare from such card group a complete bill. Such bill will customarily have the usual heading such as the name of the payee or addressee. Then, on the next line will appear street address and, on the following line there will appear the name of the town, state, and so forth. On the following lines of the bill there will follow a printed list of items of account and such items of account may or may not include alphabetical data. The need for machines for performing the foregoing general functions has been long recognized and attempts have been made to meet the recognized need.

One manner of obtaining the desired ultimate result has been to place the addressee data on separate cards, one for the name, the next for the address, and the following for the town. This proposal, while lending itself to simplification of the tabulating machine, was subject to objections, particularly in that it was necessary to keep the component address cards together and in proper sequence in the card run. This often introduced errors. Upon recognition of the above difficulties, attempts were made to place the address data on a single card. One proposal put the name and address on one card and the town or the like on a following card in the card run. A further improvement placed all the address data on one card, i. e., name, address, and town. This improvement, while facilitating card handling from an operative point of view by utilizing a single card in place of two or three cards, has heretofore introduced complexities and expense in the construction of the tabulating machine. The machine had to be provided with storage devices to retain pro tem data sensed from the combined heading card for subsequent recording by the tabulating machine.

Other proposals toward simplification of this problem have contemplated the successive sensing of a card at rest to derive data from different fields thereof.

Other constructions have been proposed in which various card zones were sensed with a card at rest with subsequent translating of the data followed by a recording.

The foregoing is a brief summary of the procedures and machine constructions which have been previously proposed to provide constructions to meet the public demand.

The present invention is directed to the provision of an improved machine which will obtain the desired results from an operative point of view and which will at the same time do so without introducing undue complexity in machine construction.

In particular, it is one object of the present invention to provide a machine which will utilize a single heading or address card which card is adapted to be followed in a card run by one or more data cards, and to further provide simplified means for analyzing such cards and controlling recording operations.

It is a further object of the present invention to provide such machine in which the use of storage means or translators in the machine are obviated.

It is a further object, subordinate to the last mentioned object, to provide a machine which dispenses with storage means without unduly complicating the data analyzing means and without sacrificing operation machine time.

A further object of the present invention resides in a provision of a record control accounting machine provided with means for analyzing a card or a plurality of cards while in motion and for thereafter analyzing one of the foregoing pair of cards at rest, and to provide means whereby the analyzing of the card at rest is effected preferably by one of the analyzing means which analyzed the card in motion.

A further and subordinate object of the present invention resides in the provision of novel controls adapted for use in connection with a novel card sensing means herein disclosed. Such controls are arranged to permit or cause a common set of sensing means to be successively used in sections to sense different fields of a common card and to furthermore permit one or more of the same sections or other sections of the above sensing means to be utilized to sense factual data from the following cards in a run.

A further object of the present invention resides in the provision of a novel optical sensing means in a record controlled machine.

A further object of the present invention, which is subordinate to the last mentioned object, resides in the provision of a novel optical sensing mechanism adapted to utilize reflected light in sensing and analyzing a perforated card. While reflected light sensing of a record is old the present invention has, for one object, to provide improved means for utilizing the reflected light under the control of a perforated record. Specifically, this object contemplates a light source and photocells on one side of a perforated record. A mirror, beyond the record, is adapted to reflect light which passes through an index perforation in the record from the source back to the controlling photocell means. Further provisions are provided whereby the photocell means are not affected by light which is reflected from an imperforate index point area of the card.

A further object of the present invention resides in the provision of an analyzing and sensing means which are particularly adapted for conjoint operation with the printing mechanism shown and described in the patent to Gray No. 1,947,259. This patent shows a mechanism which utilizes a single card cycle for both zoning and selection and in accordance with the present invention novel coordinating controls are provided to adapt the card analyzing means herein disclosed for use in conjunction with such Gray mechanism.

A still further object are novel controls whereby a change in group number automatically provides for reading data from a heading first while the card is in motion and subsequently provides for multiple card scanning while the card is at rest.

Further and other objects will be set forth in the accompanying specification and claims and shown in the drawings which, by way of illustration, show what we now consider to be an improved embodiment of the invention:

In the drawings:

Figures 1a, 1b and 1c, taken together with Fig. 1a to the left, Fig. 1b in the center, and Fig. 1c to the right show various mechanisms of the machine and the driving mechanism therefor;

Figs. 2a and 2b, Fig. 2b to the right of Fig. 2a, show a section view taken substantially on the line 2—2 of Fig. 1b and showing a card feeding photocell analyzing section of the machine;

Figs. 3a to 3d, taken together and read vertically with 3a at the top and Fig. 3b directly below, etc., show the circuit diagram of the machine;

Fig. 4 shows the timing chart;

Fig. 6 is a circuit diagram of a photocell with its associated amplifier.

The machine in general comprises a card supply hopper adapted to hold a stack of record cards which includes heading cards and data cards. From the hopper cards are picked successively and thereafter moved by a card handling mechanism past a pair of photocell sensing stations, thence to a stationary photocell scan station and thereafter delivered to the usual discharge magazine. Data from the records is read by the sensing photocells while the cards are in motion and certain numerical data is entered into the accumulator of the machine.

The machine is also provided with a recording section and other data is sensed from the records and utilized to control such recording section.

According to the present invention, sensing and analyzing of the record cards is effected by photoelectric control devices. In operation, a reflected light ray is utilized, such light ray passes from a light source through a hole in the card, to a mirror and is then reflected back through the same hole to impinge upon the controlling photocell. During certain operations, the record card is moved by the card handling mechanism with continuous motion, past a sensing station or stations and the analyzing mechanism is held stationary. During other operations, the record card is held stationary and the analyzing mechanism, or more specifically, a part of it, is reciprocated one or more times to read the record card while such card is at rest at a third analyzing station.

Generally in the operation of the machine, cards are arranged in groups and analyzed. Each card moves with continuous movement, first past one optical analyzing station and thereafter past a second stationary optical analyzing station. Following this, the card moves to a further or third station where its movement is interrupted. While at rest at this station two optical scans are effected. The second optical scanning mechanism is shifted horizontally to provide for two scanning operations of the card while at rest. Suitable printing controls were provided to print scanned data on successive lines on a record sheet. After data scanned from the heading card is recorded, further data can be sensed from the following data record cards of the group. Such data may be recorded and accumulated. On a change in control number accumulated data is read out and the total recorded. Thereafter, reset is effected and a new cycle of operations ensues on the following card group. The change in group control number starts a new sequence for reading from a heading card whereby data is first read from the heading card while in motion and thereafter it is read twice while at rest by the scanning mechanism. Thereafter the scanning mechanism is inoperative and reading from detail cards in the normal manner takes place. Machine operation may be initiated by manual controls.

Figure 5:
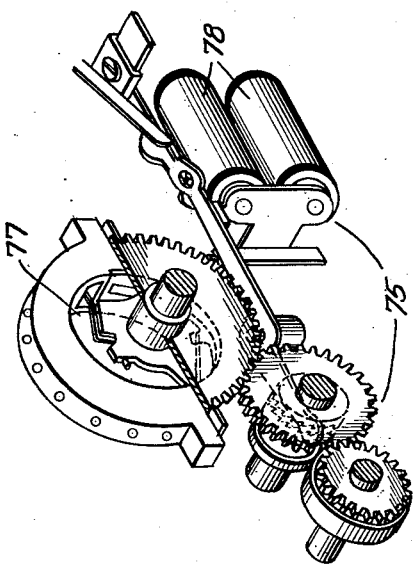
Fig. 5 is a perspective somewhat diagrammatical view showing certain elements of the accumulator together with a readout device associated therewith.

Referring to Figs. 1a and 5, 75 generally designates a Hollerith type of accumulator which is driven in the usual way from the main drive shaft 76. Shaft 76 in turn is driven from the motor M by the gearing and shafting shown. 77 (see Fig. 5) is the usual readout mechanism. For further description of the accumulator, reference may be had to Lake and Daly U. S. Patent No. 1,976,617. Reset may be effected in any suitable manner as by the Geneva drive generally designated 80 (Fig. 1a) and reset magnet 60. A full description of such drive may be found in U. S. Patents Nos. 2,045,037 and 2,049,690.

Record handling section

Fast on main drive shaft 76 is a gear 81 which drives gear 82. Fast to gear 82 is a one revolution clutch element 83 which is freely rotatable on shaft 85. Clutch dog 86 is pivotally carried on a member 87 which is fast to shaft 85. Dog 86 is tripped into engagement with the usual notch in the clutch element 83 upon energization of card feed clutch magnet 83a. Fast to shaft 85 there are a number of card feed cams generally designated CF.

Gearing, generally designated 90, drives the main drive shaft 91 of the card handling unit (see Fig. 1b). This unit (see also Figs. 2a and 2b) includes the usual card supply hopper 92 and discharge stacker 93. This unit also includes sets of card feed or card handling rolls 94 driven from shaft 91 by the helical gearing shown in Fig. 1b. Cooperating with the driven rolls 94 and geared thereto are upper feed rolls 95 (Fig. 2a). 96 designates a conventional picker driven from the picker shaft 97. This shaft is in turn driven from the shaft 91 (see Fig. 1b). Disposed to the right of the supply magazine 92 are card levers FL at the first sensing station and SL at the second analyzing station. These control contacts FL-1 and SL-1 respectively and their time of operation is shown in the timing chart Fig. 4.

*Photocell analyzing and scanning means*

Secured to shaft 76 (see Fig. 1a) is a gear 100 which drives the gear 101. Secured to gear 101, but freely rotatable on shaft 102, is the notched element 103 of a one revolution clutch. Fast to shaft 102 is an arm 105 which pivotally carries clutch dog 104. This dog is normally latched out of engagement with the clutch element 103 by a latch which is controlled by magnet 104a. Energization of latch magnet 104a permits rotation of shaft 102 in synchronism with the main drive shaft 75. Gear 100 also drives a gear 106 which thru a similar clutch mechanism under control of a magnet TM drives a shaft 107 carrying so-called T-cams and emitter 98. A pair of gears 108 and 109 transmit motion from shaft 102 to shaft 110 (see Fig. 1b). A pair of gears 111 and 112 transmit motion from shaft 110 to shaft 113.

Referring now to Fig. 2b, shaft 113 carries at its extreme end a box cam 114b. Shaft 113 also near the end adjacent gear 112 carries a similar box cam designated 114a.

Referring to Fig. 2b, link 115b is shown connected to pivoted cam follower 116b which co-operates with cam 114b. At the opposite side of the machine there is a similar link and a similar cam follower which cooperate with the other cam 114a. The link 115b (see Fig. 2a) is secured to an end plate 118b which is slidably mounted for horizontal reciprocation. A similar end plate is provided at the opposite side of the machine which is similarly mounted and attached to its corresponding link. The pair of end plates just mentioned including 118b and its counterpart, not shown but at the other side of the machine, provide a support for a light source and lens system generally designated 119 (see Fig. 2a). Also secured to the end plates are a number of mirrors 121 and photocells 120, one photocell being provided for each record card column. Disposed to the left of the light source 119 and the 120 photocell assembly, there is another analyzing device comprising a light source 122, a group of photocells 123, and a set of mirrors 124. The parts of this last-mentioned assembly are fixedly mounted. 122, 123 and 124 will hereinafter be termed a stationary optical analyzing station, but source 119, photocells 120 and mirrors 121 will hereinafter be termed a stationary and movable optical analyzing station.

During the operation of the machine, the movable photocell assembly 120 is initially stationary. However, during certain cycles of operation, when card feed is interrupted, and the clutch magnet 104a is energized, the previously stationary photocell assembly 120 is first moved rapidly to the right as viewed in Fig. 2a, then moved more slowly to the left to scan the record card which is held at rest at this time by the card handling mechanism. This operation is then repeated to provide for two scanning operations. A mirror 130 is disposed under the card when at rest at this third station. A mirror 130a is disposed under the card at the first analyzing station.

It may be explained that light from the light source 122 is directed toward the card which is in motion over mirror 130a and if there is an index point perforation in the card at a given instant the light from the light source will pass through the perforation in the card, then be reflected back through the hole in the card up to one of the mirrors 124 which mirror directs the reflected light to one of the photocells 123. There is a similar mode of operation at the second analyzing station. At this station the reflected light passes through the index point hole in the card; it is then reflected back through the hole by a mirror 130b to one of the mirrors 121 and thence to one of the photocells 120. This operation occurs when the photocell assembly is stationary and with the card in motion. When the card is at rest at the third analyzing station, namely, over mirror 130 there is again an optical sensing of the card which may be here termed a double scanning operation. The scanning of the card by reflected light takes place during the return movements of the photocell assembly, namely, when it is moving from right to left. Here, again, light from the light source 119 passes through the hole in the card at the time, when an index point perforation is encountered and this light is reflected back through the hole by mirror 130 to one of the mirrors 121 and thence to one of the photocells 120.

It may be explained that there is a common light source and lens system, but there are photocells 123 for all of the columns on the record card which are to be analyzed. It may be further explained that the photocells 123 and 120 concurrently analyze a pair of cards while such cards are in motion. This concurrent analyzation is for autocontrol purposes.

The reflected light either passes directly to the uppermost photocell as indicated in the drawings or it is reflected by a mirror to one of the photocells which is laterally disposed. This arrangement permits the use of photocells which are wider than a card column.

*Print unit*

Figure 1C:
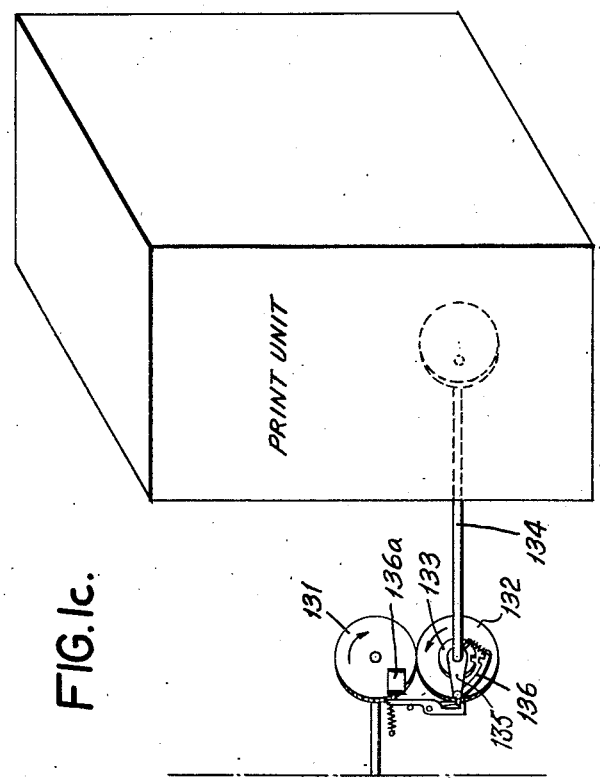

Referring now to Figs. 1a, 1b and 1c, shaft 76 has fast thereto a gear 131 which drives a gear 132. Gear 132 has fixed to it a notched element 133 of a one revolution clutch. Fast to shaft 134 is an arm 135 which pivotally carries a clutch dog 136. The clutch dog 136 is normally latched out of engagement with the clutch element 133 by a latch controlled by magnet 136a. Energization of latch magnet 136a permits rotation of shaft 134 in synchronism with main drive shaft 76. Shaft 134 corresponds to shaft 25 in U. S. patent to Gray No. 1,947,259. The printing mechanism shown in the above-mentioned Gray patent is adapted for both numerical and alphabetical printing and effects zoning for alphabetical printing and type selection during a single card cycle. The printing unit will not be further described as reference may be had to the above-mentioned Gray patent for a full explanation. In the Gray patent, Fig. 1, there are disclosed zone magnets designated 53 and intrazone magnets designated 46. These intrazone magnets are herein designated 138 and the zone magnets are designated 139. In other words magnets 139 correspond to magnets 53 of the Gray patent and magnets 138 correspond to magnets 46 of the Gray patent.

Photocell amplifier circuits

Inasmuch as current output from the photocells is very low, provision must be made to amplify this photocell current for controlling relays and electromagnets in the machine. For each photocell there is provided an amplifier unit which will be generally designated 144. The wiring of a typical amplifying unit is shown in Fig. 6. Each amplifier unit has plug socket terminals, two of which are shown in Fig. 6 to the right, namely terminals 126 and 128. There is also an additional socket 148 associated with each amplifier unit. Fig. 6 shows a typical amplifier unit generally designated 144. All amplifiers in the machine are wired in a similar manner. To designate the different amplifiers suffix letters will be used for both the amplifiers and their terminals such as 144a, etc, 126a, etc.

Before describing the circuit diagram and general operation of the machine, a brief description will be given of the photocell amplifier unit. There is an amplifier unit for each photocell in the machine. For each photocell 120 there are two triode electronic tubes T1 and T2, see Fig. 6. The plates of these tubes are connected to plug sockets 126 and 128. The cathodes of the pair of tubes are commonly connected through cam contacts such as CF3 to the negative side of the voltage supply. The cathodes are also connected to one side of a bias voltage divider P1. P1 has connected across it a biassing battery V1. The other side of the divider is connected through a battery V2 to the photocell 120. The other side of the photocell 120 is connected to the grids of tubes T1 and T2 through resistors R1 and R2 respectively. A connection is also made from this side of the photocell through a resistance R3 to the arm of the voltage divider P1. The positive side of the line is connected to a magnet such as 138 and by plug connection to plug hub 126 or 128. Similar amplifier units are provided for photocells 123 and such photocells 123 are controlled by cam contacts CF2. In order to explain the operation, let it be assumed that a relay or magnet, as the case may be, is connected to plug hub 126. The arm of the voltage divider will have been previously set so that with no light or with only a certain minimum of light on the photocell 120 the tubes T1 and T2 are in cut-off status. With cam contacts CF3 closed when brilliant light is reflected on the photocell current will flow in the V2—R3 circuit to decrease the bias on tube T1 and permit current to flow from the negative side of the line through cam contacts CF3 to cathode of tube T1 through the tube T1 through plug socket 126, through the connected relay or magnet to the positive side of line. Similarly, if the relay or magnet is connected to plug socket 128, current will flow from tube T2 to energize the relay magnets when bright light impinges upon the photocell 120.

Circuit diagram and machine operation

Before the machine is placed in operation, certain plug connections are first made. Referring to the circuit diagram, Figures 3a to 3d inclusive, plug connections for auto control purposes are made from socket 147 to socket 148 (Fig. 3a) which is associated with the photocell 123 for the first analyzing station. As explained before, each photocell is positioned to read a particular card column and the operator will connect up the photocells which analyze the control number columns for the particular run which is made. Further auto control connections for the second card analyzing station are made from sockets 147a to sockets 148a pertaining to amplifier unit 144a. This amplifier unit 144a is associated with photocell 120 at the second analyzing station. For purposes of accumulator control, further plug connections are made from 147c to 148b of amplifier unit 144b. Amplifier units 144b are associated with the photocells 120 which analyze the columns pertaining to the number or amount which is to be accumulated. The output of amplifiers 144 and 144a is used for auto control purposes. These plug connections will now be described.

It is assumed that a 2-column, namely, units and tens order auto control number is to be analyzed at the first analyzing station. Accordingly the amplifiers 144 are labeled units and tens as shown in Figure 3a. The units amplifier 144 is connected by plugging from socket 126 to the plug socket 152a of relay coil Uu which is the units column auto control relay. Similar connections for relay Ut, which is the tens order auto control relay, are made by plugging from socket 126 of the tens order amplifier 144 to socket 152a of relay coil Ut.

Auto control connections from second analyzing station amplifiers

For the second analyzing station there are similar amplifier units 144a for the units and tens orders. Plug connections are made from plug socket 128a of the units order amplifier 144a to socket 152a. Likewise for the tens order amplifier 144a connections are made from socket 128a (Fig. 3b) to socket 152a (Fig. 3a) of relay coil Ut. Plug connections 153a and 153b are made as shown on Figure 3a.

For an understanding of the matter of plugging it should be here mentioned that the auto control columns are in one field of the heading card and in a similar field of the data card. The columns pertaining to the name are in a different field of the heading card. The columns pertaining to the address (street number) are in a still different field of the heading card. Columns pertaining to the town are in a further different field of the heading card. The columns for account data on the detail cards may be in any field thereof including such columns corresponding to those used for heading data on the heading card.

The plug connections for controlling the printing of name and address data from the second analyzing station will now be described. Referring to Figure 3b there are two amplifier units designated 144c shown. It is obvious that more amplifying units will be employed to control the name printing. Amplifier units 144c at the left are connected in parallel by a jumper as shown in Figure 3b and the upper socket 148c is connected by plug connection to socket 147b. A plug connection is made from the lower amplifier unit 144c from socket 128c to socket 154b. Further plug connections are made from socket 155b to socket 156b. The connections for the upper amplifier unit 144c will now be described. From socket 128c to socket 154a like connections are made. Connections are also made from socket 155a to 156a.

Referring now to amplifier units 144d which are for address purposes, two of these units are shown and their plug terminals 148d are connected by a jumper as shown. From the upper 148d plug socket a connection is made to 148c. From plug socket 128d of the upper unit 144d a plug connection is made to plug socket 161a. For the lower unit 144d a similar connection is made from socket 128d to 161b.

Referring to Figure 3c, two amplifier units are here shown designated 144e. Sockets 148e are connected by a jumper as shown and the upper socket 148e is connected to the lower socket 148d. From output socket 126e of the lower unit 144e a plug connection is made to socket 163b. Referring now to the upper 144e unit, a plug connection is made from socket 126e to socket 163a.

It has been previously explained that amplifier units 144b are for accumulator control purposes. The sockets 148b of these units are connected to socket 147c. The output socket 126b of the lower amplifier unit is connected to plug socket 164. Referring now to the upper amplifier unit 144b, plug connection is made from socket 126b of this unit to plug socket 165. It may be explained that the units and tens accumulator magnets 78 respectively are connected to plug sockets 164 and 165.

For the purpose of listing data which is accumulated, the same amplifier units 144b are connected to print magnets 138, Fig. 3c. These connections are as follows: From the lower amplifier 144b which analyzes the tens column plug connections made from socket 128b to socket 156 of the tens order print magnet 138. For the units order similar connections are made as follows: From plug socket 128b of the upper amplifier 144b, a plug connection extends to plug socket 156 of the units order print magnet 138. Total printing plug connections are made from the output sockets 166 of readout 77 to the sockets 156 connected with printing magnets 138.

For deriving alphabetical and numerical data from detail cards in the columns which correspond to those which are utilized on the heading card, certain plug connections are made from the amplifiers 144b, 144c, etc. For the upper amplifier 144c (Fig. 3b) a connection is made from socket 128c to 160a. Similar connections for other columns are completed as shown, i. e., from the lower amplifier 144c, plug socket 128c is connected to plug socket 160b. From the upper amplifier 144d, plug socket 128d is connected to plug socket 160c, and from socket 128d of the lower amplifier a connection is made to plug socket 160d (Fig. 3c). While only four columns are shown plugged up on the diagram, it is obvious that as many columns may be used as desired.

Operation

The operator first places in the feed hopper a group of record cards. These will include for each group a leading heading card and following the heading card will be one or more data cards, the data cards being also provided with auto control data. Beyond the last data card there will be a further heading card followed by further data cards, and so forth. The operator first closes main line switch 171 (Fig. 3d) providing current supply for lines 172 and 173. Power is likewise supplied to the two light sources 119 and 122 and to the driving motor M. The operator now depresses start key 251 to energize card feed clutch magnet 83a and card feed relay A. The first card feed cycle will now ensue and during this cycle the heading card is fed so that its leading edge at the end of the cycle is at the first analyzing station.

The first card lever FL now operates causing closure of contacts FL-1 to complete a circuit to energize relay coil M. Relay coil M is maintained energized when contacts FL-1 open between cards by cam contacts CF-8 and relay contacts M-1. Relay coil B (Fig. 3d) is also energized during this cycle upon closure of cam contacts CF-1 which complete a circuit through contacts M-2. Relay B is maintained energized by its contacts B-1 and the normally closed contacts N-2 of relay N and the closed contacts M-2 of relay M.

The start key may be held depressed through the first card cycle or alternatively it may be depressed twice to start the first and second card feed cycle. In either event with 83a and A energized once contacts M-3 close, and with relay contacts A-1 closed, magnet 83a and relay A are maintained energized until the holding circuit is opened.

During the second card feed cycle the first or heading card is fed past the first analyzing station. During this cycle the print control clutch magnet 136a is energized through contacts M-4 which are now closed, through normally closed contacts N-4 of relay N and cam contacts CF-4. Relay C is also energized through contacts B-2 and cam contacts CF-5. Relay C is maintained energized by contacts C-1 and cam contacts CC-2. Near the end of the cycle the second station card lever contacts SL-1 close to energize relay coil N. This relay is maintained energized when contacts SL-1 open between cards by a holding circuit through relay contacts N-1 and cam contacts CF-9. Relay contacts N-9 are now opened and prevent further effective control through the start key circuit.

At this stage of operation the first or heading card is just ready to be analyzed by the second analyzing station. The following data card is approaching the first analyzing station. During the analyzation which follows on the next card feed cycle, the data card is analyzed at the first analyzing station for its auto control number and the heading card is similarly analyzed for its control number at the second analyzing station. During the same card feed cycle in which the heading card is being analyzed for its auto control number, it will also be analyzed for the main portion of the heading. Notwithstanding that there is concurrent analyzation for the address portion of the heading and the town portion of the heading at this time, only the photocells pertaining to the name portion will be affected. This control is afforded by contacts C-4 (Fig 3b), relay C being energized at this time. With contacts C-4 closed, the output of the amplifiers 144c is permitted to flow to the print magnets 138 and 139. During this analyzing cycle, power is supplied to the amplifiers 144, 144a, 144c, 144d and 144e, through cam contacts CF-2, CF-3 and CC-5, Figs. 3a, 3b and 3c. Print clutch magnet 136a is also energized thru contacts D-2.

For illustrative purposes, assume a column of a name bears a punched representation of the character E. This representation on the heading card comprises a 12 and a 5 perforation in the same column. At the 5 index point, the activation of photocell 120 causes a flow of current from plug socket 128c of amplifier 144c upper (Fig. 3b) via plug connection to socket 154a, through relay contacts C-4 now closed, plug socket 155a, through plug connection to 156a, through intrazone control magnet 138, to the positive side of line.

At the 12 index point in the cycle, photocell 120 is again activated and a circuit similar to the one just traced is completed through contacts C-4. The circuit at this time extends through distributor 107a, through zone magnet 139, to line 173. The timed activation of magnets 138 and 139 (which correspond to magnets 46 and 53 respectively in U. S. patent to Gray No. 1,947,259) causes printing of the character E at the proper time in the cycle.

It will be remembered that it is desirable to provide auto control between the auto control data on the heading card and the data card which follows, and such auto control is to be effective between successive data cards.

During the cycle in which printing occurs, auto control operations also take place. Activation of the auto control photocells 123 and 120 will, through the plug connections previously traced, cause current flow through the U relay coils. These relay coils are so designed and the amplifiers 144 and 144a for photocells 123 and 120 are respectively so adjusted that simultaneous operation of both amplifiers will cause sufficient current flow to actuate relay U and cause its U-1 contacts to close, whereupon relay U is maintained energized through its cam contacts CF-6. Briefly, if one amplifier unit is energized and the other one is not energized for the same card column, which is concurrently sensed at the first and second stations, there will be insufficient current to provide energization of the related U relay coil. However if both amplifiers supply current, signifying concurrent photocell activation, the relay coil U will be energized.

Energization of all the U-coils pertaining to the auto control will permit card feeding operations to continue. In the event of a control change all of the U coils will not be energized. The manner in which a control break will cause stoppage of the machine will be subsequently explained. During the cycle, when the first card is being analyzed at the second station, a relay D, Figure 3d, is energized under control of relay contacts C-3 and cam contacts CC-3. Relay D is maintained energized through contacts D-1 and cam contacts CC-4. With relay D energized the print clutch magnet 136a is energized through contacts D-2. During this cycle and on closure of cam contacts CC-1 and with relay contacts C-2 closed, a circuit is completed to energize the scan clutch magnet 104a. Energization of relay D opens relay contacts D-4 to de-energize card feed clutch magnet 83a and relay A. At the time the above operation has occurred the first or leading record card is at the stationary scanning station over mirror 130. During the next machine cycle the heading record card will be analyzed at rest to determine the address portion of the heading. With the clutch magnet 104a energized, drive is provided to cams 114a and 114b. The photocell assembly on plates 118a and 118b is first moved to the right as viewed in Figure 2a. Scanning is effected during the portion of the cycle when the photocell assembly is returned to the left. This movement to the left is in synchronism with the movement of the printing and accumulator mechanisms and affords analyzation of the heading card while it is at rest. During this scan cycle with relay D energized, the analyzing impulse or impulses are routed from a different amplifier group, namely 144d. This routing operation is effected by the closed D-3 relay contacts (Fig. 3b). By the foregoing operations the address will be printed in corresponding columns of the record sheets and under the name data which was previously printed thereon.

Near the end of the first scanning cycle, with the heading card at rest, relay coil E (Fig. 3d) is energized through cam contacts CC-6 and relay contacts D-5, now closed. Relay coil E is maintained energized under control of contacts E-1 and cam contacts CC-7. Closure of relay contacts E-5, provide a circuit to maintain print clutch magnet 136a energized. Contacts E-3 also close to again energize the scan clutch magnet 104a. A second scanning cycle now ensues. In this second scanning cycle the signal impulses for the photocell amplifiers will be from those pertaining to the town and State portion of the heading, namely, from amplifier units 144e. These impulses will be routed through the now closed E-2 contacts of relay E (see Fig. 3b). Current will flow to the print control magnets 138 and 139 through the circuits previously traced. During the second stationary scan cycle the card feed clutch magnet 83a and relay A are energized by a circuit through relay contacts N-5, now closed, and relay contacts E-6 and cam contacts CC-8. During this cycle relay J is energized under control of relay E. The circuit extends from the line 172 through relay contacts E-7, cam contacts CC-11, relay J to the line 173. Relay J is maintained energized through contacts J-1 and cam contacts CC-12. Relay contacts J-2 close and when cam contacts CC-13 close relay K will be energized. This relay is maintained energized through contacts K-1 and cam contacts T-12.

During the second scanning cycle when the third line of the heading is to be printed, relay contacts E-5 are closed and a circuit is completed from line 172 through relay contacts E-5, cam contacts CC-10 to energize relay coil F. F is maintained energized through the total cycle through F-1 and total contacts T-11.

Energization of card feed clutch magnet 83a initiates a new card feed cycle. 83a is energized by a circuit from line 172, relay contacts N-5, E-6 and cam contacts CC-8. During this cycle auto control functions occur as previously described.

The accumulator control circuits will now be described. The accumulation is being taken from the first detail card which is now at the second analyzing station. To render the amplifiers 144b which control accumulation effective, a circuit is completed from the left hand side of line 172, through relay contacts N-8, now closed, cam contacts CF-3, relay contacts K-3, plug socket 147a, and plug connection to plug socket 148b, and by a jumper connection to lower plug socket 148b associated with the lower amplifier 144b. Assume the digit to be accumulated to be 6. At the 6 index point of the cycle a circuit will be completed from plug socket 126b to plug socket 165, through accumulator magnet 78, to the right hand side of line 173. Energization of the accumulator magnet 78 at the 6 index point will, in the usual manner, cause an entry of 6 into the accumulator.

The machine continues to run and data will be accumulated and listed from detail cards. At the same time when accumulation occurs, listing circuits for the accumulated number, are completed as follows: From plug socket 128b of upper amplifier 144b to plug socket 156 of (by way of example) the units order print magnet 138, back to the other side of line 172.

Previously it was mentioned that in the present machine provision was made for printing alphabetical or numerical data from the data cards from the same columns which were used in the heading cards. In the circuit diagram four columns are shown as plugged but obviously more would be utilized in a full size machine.

During the card analyzing cycle, when detail cards are being analyzed at the second analyzing station, circuits will be completed to the print magnets 138 and/or 139 in the following manner: Consider upper amplifier unit 144c. Upon activation of this amplifier a circuit will be completed from plug socket 128c to plug socket 160a (Fig. 3b), through relay contacts K-4, plug connection from plug socket 155a to 156a and 159a, for the control of print magnets 138 and 139 respectively.

Ultimately a break in auto control will occur. When a break in auto control occurs all of the relays U will not be energized due to the fact that their corresponding pair of amplifiers are not simultaneously activated under photocell control.

Thereafter, upon closure of cam contacts CF-6 (Fig. 3a) a circuit will be completed from line 172 through cam contacts CF-6, relay contacts N-7, cam contacts CF-7, the normally closed contacts of the U-relays by plug connection 153a or 153b, relay coil P to the other side of the line. Relay coil P is maintained energized by relay contacts P-1 and cam contacts T-6.

Energization of relay coil P causes relay contacts P-2 (Fig. 3d) to energize relay coil G through the now closed T-2 contacts, relay contacts G-1, now closed, and relay contacts F-2, now closed, energize print clutch magnet 136a.

Relay contacts G-2 and F-3 close to energize control magnet TM (described previously) which causes rotation of the T cams and the emitter 98 through two machine cycles. Relay contacts P-3 also open to de-energize card feed clutch magnet 83a and relay A, thus terminating card feed. During the total taking cycle with emitter 98 rotating, a circuit is completed through contacts T-3, emitter 98, readout 77, through the plug connection from sockets 166 to sockets 156, print magnets 138, back to the other side of line 173. The impulses emitted through this circuit will control readout of the accumulator amounts and cause printing of a total.

Approximately in the middle of the total taking cycle (see timing diagram, Fig. 4), cam contacts T-4 close to energize reset magnet 60 (see Fig. 3d), which effects reset of the accumulator during the latter half of the total taking cycle. During this portion of the total taking cycle the circuit is completed from line 172 through relay contacts N-6, cam contacts T-5 to energize relay coil C. A circuit is also completed through relay contacts C-6 and cam contacts T-7 to energize print clutch magnet 136a. Cam contacts T-8 close to complete a circuit to energize card feed clutch magnet 83a and relay A.

When a detail card is followed by a heading card with a changed auto control number, special controls will be set up as the last detail card of the old group passes the record analyzing station and as the heading card passes the first station. The special controls cause the heading card to be read once at the second analyzing station and to be read twice at the third analyzing station. The controls also cause the heading card to be held at the third analyzing station during two card scanning cycles. Operation of these controls is initiated by energization of relay coil C. A new card feed cycle now ensues during which the heading card, preceding a new group, is analyzed in motion at the second scanning station for the name part of a heading. This cycle will be followed by a stationary scan cycle as previously described, where the address part of the heading will be printed. A further stationary scan cycle ensues where the card is analyzed for the "town and state" part of the heading.

The controls for effecting these cycles have been previously described.

When a heading card is followed by a detail card with the same control number, or when one detail card is followed by another detail card with the same control number there is no break in auto control. Under these conditions relay coil C will not be energized. Accordingly the detail card will be first fed to the third station but at said station, unlike the heading card, it will be fed through such station without any scanning whatsoever.

Summarizing operations of relay coil C: With this coil energized signifying a break in auto control, relay contacts C-2 will close to energize the scan clutch magnet 104a upon closure of cam contacts CC-1. Relay contacts C-4 will also close to permit the same part of the reading to be read to the first control magnets 138 and 139. Relay contacts C-3 close and upon closure of contacts CC-3 relay coil D is energized to permit the street and address portion of the heading to be read out. Energization of relay coil D will also interrupt card feed to cause the heading card to be held at the third analyzing station. When relay contacts D-4 open, the holding circuit for card feed clutch magnet 83a through relay contacts A-1 will be open, closure of relay contacts D-5 complete a circuit upon closure of CC-6 to energize relay coil E. Relay contacts E-2 close to permit the town and State part of the heading to be read into print magnets 138 and 139. Relay contacts E-3 also close to again energize the scan clutch magnet 104a. With relay contacts E-6 closed, and upon closure of cam contacts CC-8, there will be a re-energization of card feed clutch magnet 83a.

If there is no break in auto relay, coil C will not be energized. Relay coil D will not be energized and relay coil E will not be energized. Accordingly the controls just described will be ineffective and card feed will be continued to cause the detail cards to be fed without interruption through the third analyzing station since relay contacts D-4 have not opened.

*Last card conditions*

During the last card condition, as the last card passes the first sensing station the opening of card lever contacts FL-1 and cam contacts CF-8 will cause relay M to be de-energized. During the feed of this card past the second station the card controlled contacts FL-1 will open to de-energize relay coil M. During this cycle with M already de-energized, the amplifiers 144 cannot be activated. This will prevent energization of the auto control relay U causing energization of relay coil P in the manner previously described to indicate a control change. Energization of relay coil P will pick up relay coil G as previously described. Energization of relays P and G cause drop out of relay clutch magnet A and pickup of clutch magnet TM respectively. This initiates a final total taking cycle in the manner previously described. After the readout operation, the accumulator will be reset. At the end of this cycle the last card will be resting at stationary scan station over mirror 130. Card feed magnet 83a will be energized by cam T-8 to feed the card into the hopper 93. Contacts P-4, being open prior to this time, will prevent inadvertent manual operation of the card feed.

Single card group

In the event a card group consists of but a single card, a somewhat different sequence occurs. Passage of a single card group past the second analyzing station will indicate a control change and normally a total taking cycle would follow immediately. Since this card is, however, the first card of a group, the energization of auto control relay P, indicating a control change, will be ineffective until relay coil E is energized during the last scan cycle. With P energized, relay coil G will be energized. However, relay coil F will not be energized until energization of relay coil E has occurred. With G and F both energized, magnets TM and 136a will be energized as previously described and cause a total taking cycle.

General summary

The present machine is intended for controlling printing operations from record cards which comprise heading cards and data cards. A single heading card will usually precede a group or considerable number of the data cards. The heading cards contain index point perforations which represent several lines of data. For example the first line may be a name, the second an address, the third a town and State. The cards, properly grouped, are placed in the machine and thereafter the cards are moved by card handling mechanism past scanning or analyzing stations. At the first two scanning stations the cards are scanned while in motion and at the third station the card is held stationary and the scanning device, which is of an optical nature, is moved to scan the card while the device itself is in motion. The first scanning station is utilized for auto control purposes only. The second scanning station is used for controlling the printing of the name from the heading card and for auto control purposes from both heading and data cards. Analyzation at the second scanning station is also utilized for controlling accumulating operations and for controlling printing operations for any data which is derived from the detail cards. The third scanning station is utilized to scan the address and town data from the heading cards in two successive scanning operations.

When detail cards pass to the third station there is no interruption of card feed and there is no scanning of such cards. Such detail cards are scanned only at the first and second analyzing stations.

Control for the analyzing of heading cards is effected in two ways. One, under manual control of card feed initiation and, two, under control of auto control mechanism. Number one or manual control is a control for starting up condition while number two is a control for running condition.

What is claimed is:

1. A card sensing mechanism for a record controlled machine including, in combination, two card sensing mechanisms, card handling mechanism for feeding cards in a run continuously past said two sensing mechanisms, said card handling mechanism including card stopping means to stop the continuous feed of cards upon a leading card passing the second sensing mechanism, said sensing mechanism having provision for sensing index point data from each record while in continuous motion past both sensing mechanisms, and sensing mechanism displacing means to shift one of said sensing mechanisms over the stopped card whereby it is scanned by the said mechanism.

2. A record controlled accounting machine including an alphabetical printing mechanism of the type having zone selecting controls and intrazone selecting controls and adapted to zone select and finally select type in a single card cycle, card handling mechanism for passing cards in a run through the machine, mechanism for coordinating the card handling mechanism with the printing mechanism and comprising, in combination, card sensing means and card analyzing means for sensing index point data on a card while in motion and for also sensing data from a card while at rest, means controlling the card handling mechanism to cause first a continuous card movement and thereafter an arrest of the card to permit the analyzation both in motion and at rest and shifting means for shifting the card analyzing means while such card is at rest to provide for analyzation of such card, and controlling connections intermediate the card sensing and analyzing means and the zone selecting controls and intrazone selecting controls of said printing mechanism for controlling such controls from the said sensing and analyzing means.

3. A record controlled accounting machine, including in combination a card handling mechanism for feeding a succession of cards, a pair of optical card analyzing and sensing stations past which each card is fed by said card handling mechanism, means for controlling the card handling mechanism to arrest the feed of a card after it has passed the second optical station and for then holding the card at rest for subsequent optical scanning, and opearting mechanism for shifting the second optical sensing and analyzing station over the card at rest for scanning said card.

4. A record controlled accounting machine including an alphabetical printing mechanism with zone controls and type selecting controls adapted for zoning and type selection in a single card cycle, a card handling and feeding mechanism for feeding cards in succession, first continuously and then with an interruption of card feed which is again followed by a continuous card feed, card analyzing means for analyzing cards during their continuous motion and for also analyzing the card when it is held stationary upon interruption of card feed, control connections intermediate said analyzing means and the aforesaid zone selecting controls and type selecting controls of the alphabetical printing mechanism, and means for selectively controlling said control connections to cause first one zone of a card to be controlling while the card is in continuous movement and thereafter cause another zone of the card to be controlling while said card is at rest and to cause a further zone of the card to be controlling when a card is at rest whereby the printing mechanism is controlled for printing on successive lines data derived from said three card fields.

5. In a machine of the class described comprising in combination card handling mechanism with provision to feed cards with a continuous motion past two stations and with provision to hold a card at rest at a third station, a pair of optical scanning devices for scanning the cards while in continuous motion past the first and second stations displacing means for one of said optical scanning devices to move the scanning device twice over the card which is held at rest at the third station whereby two scans of said card may be obtained while it is at rest at the third station.

6. A record controlled machine including a card handling mechanism, control means therefor to cause a continuous card feed past two analyzing stations followed by a suspension of card feed at a third analyzing station wherein a card is held at rest, card analyzing means with provision for analyzing the cards during their continuous motion past the first two analyzing stations, and means for utilizing a portion of said card analyzing means to analyze a card while at rest at the third analyzing station, said last named means including means to shift the utilized portion of the analyzing means relatively to the card which is at rest.

7. A record controlled machine including a card handling mechanism, control means therefor to cause a continuous card feed past two analyzing stations followed by a suspension of card feed at a third analyzing station wherein a card is held at rest, optical card analyzing means for analyzing cards when in motion and for also analyzing a card at rest, said optical means for analyzing a card at rest including means to shift the optical means relatively to the card at rest.

8. A record controlled tabulating machine, having a printing mechanism adapted for numerical and alphabetical printing, card handling mechanism for feeding cards with a continuous motion past two analyzing stations and for feeding each card to a third analyzing station where such card is held at rest, dual analyzing means for analyzing the cards while in motion past the two analyzing stations, means for moving one of said dual analyzing means for also analyzing each card while at rest at the third analyzing station, and means to successively control the printing mechanism by said dual analyzing means whereby multiple sets of data from an analyzed card may be printed in multiple lines on a record sheet.

9. A record controlled machine adapted for deriving data from heading cards and data cards, comprising card handling mechanism for feeding the heading cards and data cards past two analyzing stations and to a third station, control means for said card handling mechanism to cause continuous feed of the cards past the first two stations and suspension of card feed at the third station, and dual card analyzing means having provision for analyzing cards while in motion past the first two stations, and means for moving one of said dual analyzing means to analyze a card which is at rest whereby multiple sets of data may be derived from a single record card.

10. A record controlled machine having three analyzing stations, card handling mechanism for feeding cards with a continuous motion past the first two stations and for suspending card feed and for holding a card at rest at the third station, a pair of optical card analyzing devices adapted to analyze the cards while in motion past the first two stations, and control means for one of said optical devices to utilize it for scanning a card and analyzing it while at rest at the third station.

11. In a record controlled machine, means for analyzing data on heading cards or detail cards, means controlled by the last mentioned means for recording data derived from heading and detail cards on a record sheet, shiftable control means including sequence relays and control means therefor to divert the analyzed entries from heading cards in one way to the recording means and for differently diverting the analyzed entries from detail cards to the recording means whereby common columns on heading and detail cards may be recorded in a different relation on a record sheet.

JAMES W. BRYCE.
ROBERT T. BLAKELY.

REFERENCES CITED

The following references are of record in the file of this patent:

UNITED STATES PATENTS

| Number | Name | Date |
|---|---|---|
| 1,916,232 | Paris | July 4, 1933 |
| 1,947,259 | Gray | Feb. 13, 1934 |
| 1,962,732 | Bryce et al. | June 12, 1934 |
| 2,036,024 | Daly | Mar. 31, 1936 |
| 2,093,529 | Tauschek | Sept. 21, 1937 |
| 2,115,563 | Tauschek | Apr. 26, 1938 |
| 2,182,006 | Tauschek | Dec. 5, 1939 |
| 2,426,951 | Ritzert | Sept. 2, 1947 |
| 2,448,830 | Robbins et al. | Sept. 7, 1948 |